Jan. 20, 1953         J. S. STULL         2,625,967
SCREW-HOLDING AND SCREW-DRIVING TOOL
Filed Dec. 19, 1949         2 SHEETS—SHEET 2
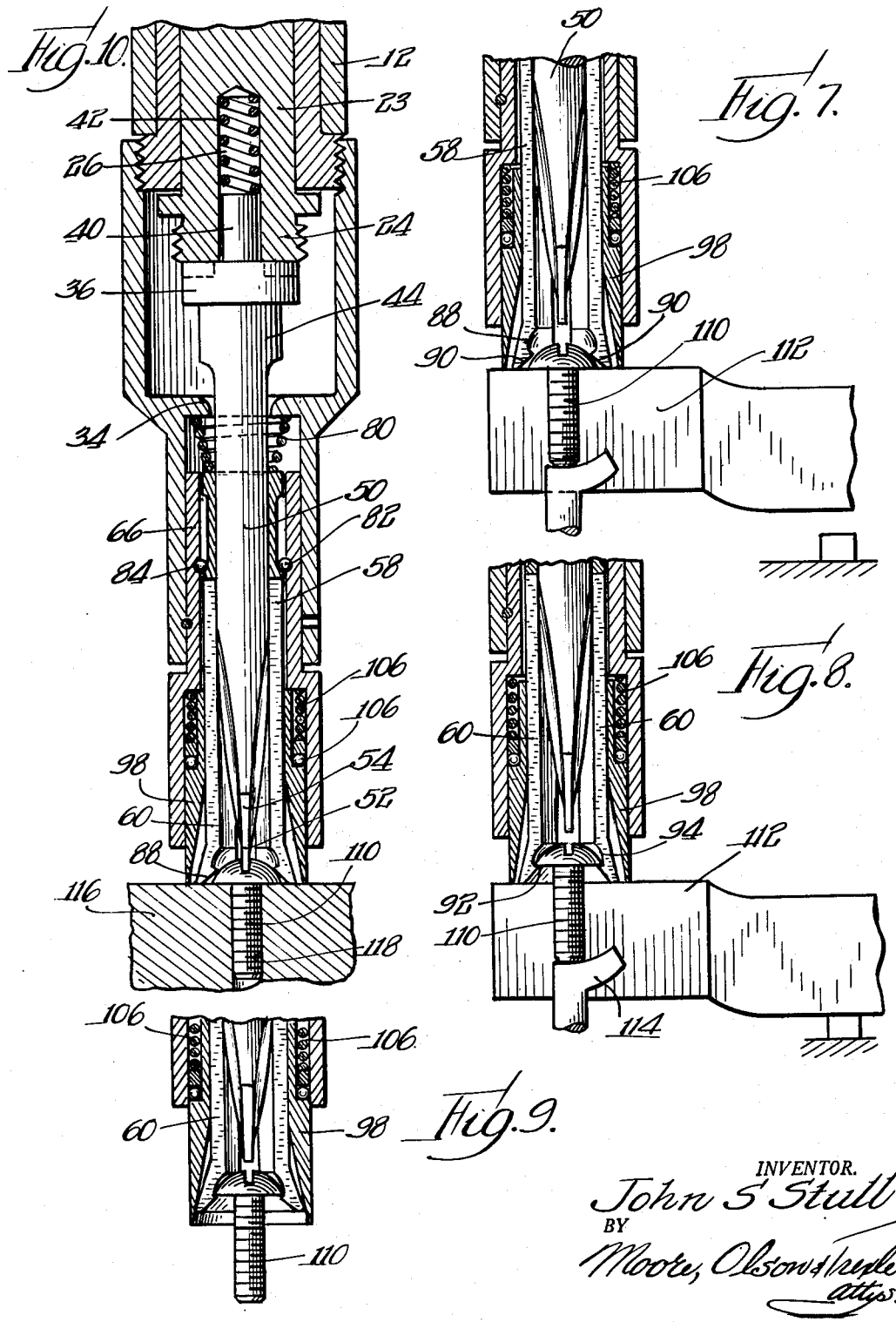
INVENTOR.
John S Stull
BY
Moore, Olson & Trexler
attys.

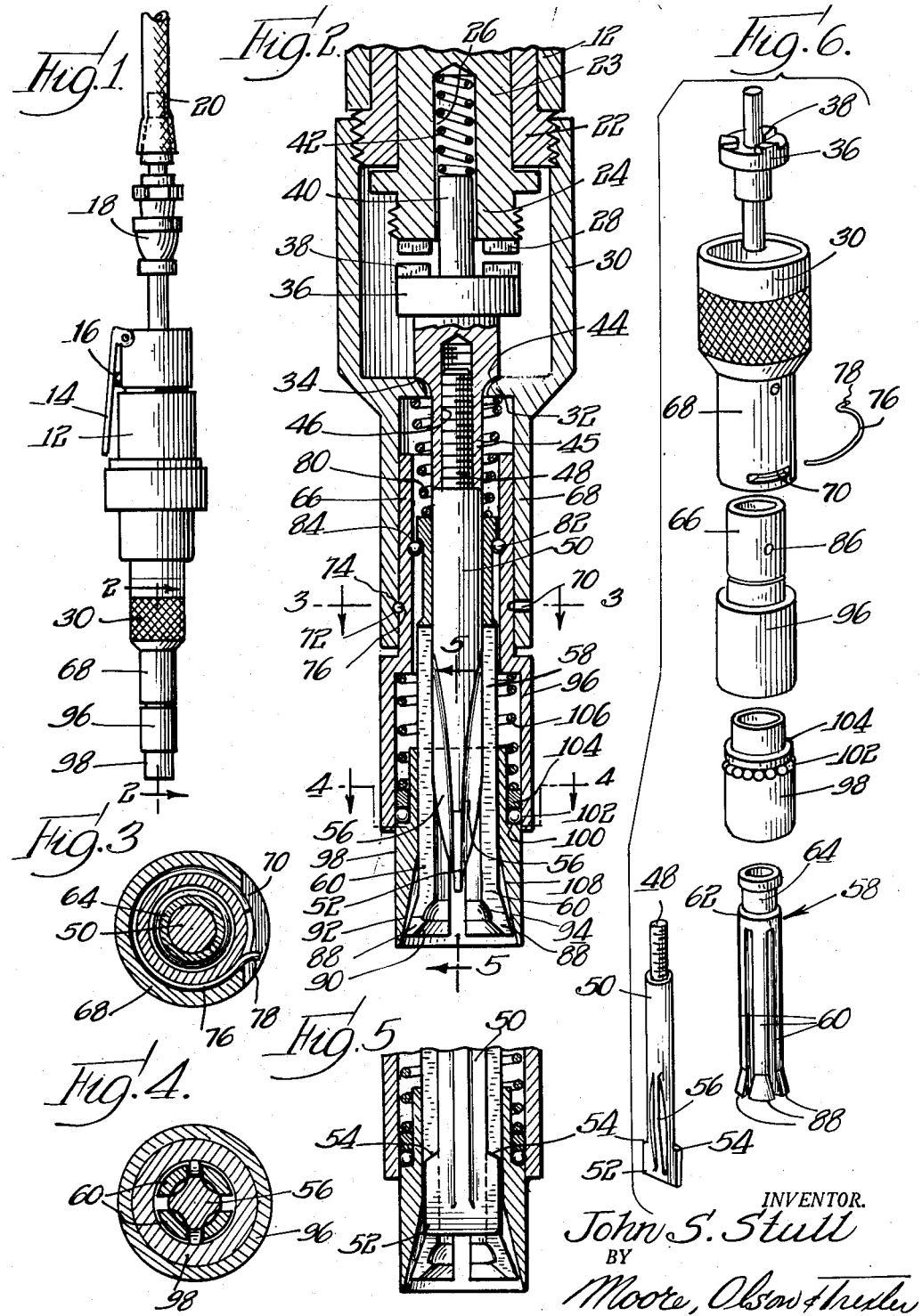

Patented Jan. 20, 1953

2,625,967

UNITED STATES PATENT OFFICE 2,625,967

SCREW-HOLDING AND SCREW-DRIVING TOOL

John S. Stull, Chicago, Ill., assignor to Illinois Tool Works, Chicago, Ill., a corporation of Illinois Application December 19, 1949, Serial No. 133,889

6 Claims. (Cl. 144—32)

1

This invention relates to an article pick-up and driver, and more particularly to a pick-up mechanism for handling a screw and which is adapted to hold a screw in driving position and to automatically release the screw when driven into the work part or piece.

Applicant has discovered that in order to facilitate the picking up and positioning of a headed fastener such as a screw, pin, or other stud-like member, it is essential that the means for automatically gripping the screw or other article automatically release the same when it has been brought into engagement with the work or parts to be fastened or has been positioned at the desired work station.

Applicant has further found that such article or fastener pick-up should be cooperable with a driver, such as a screw driver, to align the article with the driver and release the article when it has been driven into the work part. In the case of a hand held driver, either power or hand operated, it is essential that the pick-up should be carried by the driver.

Previous screw drivers with pick-up devices have generally relied upon pivoted arms or on collet fingers which are pressed against the head or shank of an article or fastener in axial alignment with the driver by a sleeve or collar slid over the arms or collet fingers and supplying clamping force thereto. Many of these mechanisms have required the sleeve to be advanced or retracted by hand and have thus been useful only for manual two-handed operation or for semiautomatic operation in which one hand must be used to position the sleeve.

An object of this invention is the provision of a device for picking up and retaining an article or fastener and automatically releasing the same as it is positioned in its desired station.

A more particular object of this invention is the provision of an article or fastener pick-up device in which an article or fastener is engaged by resilient or yieldable collet fingers lightly to grip and retain the same.

Many prior article or fastener pick-up devices have frictionally engaged the head of an article to retain the article while others have been provided with spring fingers or spring biased fingers to engage under the head of an article to retain it. A common failing of both of these types of devices is that an article can be readily moved axially out of engagement with the pick-up device prior to proper positioning or driving of the article.

Another object of this invention is the provision

2 of an article or fastener pick-up device in which resilient collet fingers lightly and positively engage an article or fastener and are held in retaining position by a longitudinally shiftable sleeve or collar precluding spreading of said collet although exerting substantially no clamping force on said collet fingers.

A specific object of this invention is the provision of an article or fastener pick-up device as set forth in the last previous object, in which the collet retaining sleeve is resiliently biased, by a small pressure, into collet retaining position and is positively urged into collet releasing position by engagement with the article or fastener support.

In many prior screw pick-up devices there has been no means to preclude a screw being driven by a screw driver blade from rotating relative to the pick-up means. This causes marring of the screw head and may cause the screw to be released prematurely.

Another specific object of the invention is the provision of a screw pick-up and driving device in which relative rotation of the screw driver and screw pick-up means is positively precluded while the driver is in operative engagement with a screw.

Other and further objects and advantages of the present invention will be apparent from the following description when taken in conjunction with the accompanying drawings, in which:

Fig. 1 is a side elevational view of my invention as applied to a hand-held pneumatic screw driver;

Fig. 2 is an enlarged longitudinal sectional view taken along the line 2—2 of Fig. 1;

Fig. 3 is a cross-sectional view taken along the line 3—3 of Fig. 2;

Fig. 4 is a cross-sectional view taken along the line 4—4 of Fig. 2;

Fig. 5 is a fragmentary sectional view taken along the line 5—5 of Fig. 2;

Fig. 6 is an exploded perspective view of the parts shown in Fig. 2;

Figs. 7 through 9 are fragmentary longitudinal sectional views similar to Fig. 5 showing the parts in various positions picking up a screw; and Fig. 10 is a longitudinal sectional view similar to Fig. 2 showing the parts in position at the end of a screw driving operation.

In Fig. 1 my invention is shown as applied to a hand-held pneumatic screw driver, although it is to be understood that my invention has equal applicability to other types of screw drivers including hand-driven screw drivers, and to the picking up and positioning or driving of other headed articles or fasteners. The screw driver may comprise a casing 12 containing the usual air motor and having a trigger 14 pivotally secured and abutting against a valve plunger 16 to operate the motor. A pipe and fitting 18 may extend from the top of the casing and have secured to them a flexible air hose 20. As may be seen in Fig. 2, the screw driver includes a threaded coupling 22 extending below the casing 12. Within the coupling 22 is a drive shaft 23 driven by the air motor within the casing 12. The drive shaft 23 carries at its lower end a conventional driving clutch member 24 which has an axial aperture 26 extending into the drive shaft 23 and carries on its lower face a plurality of driving lugs 28. A nose piece 30 is threaded onto the coupling 22 and has an inwardly extending peripheral flange 32 having a substantially quarter-round inner annular surface 34. A driven clutch member 36 which has a plurality of lugs 38 for cooperation with the lugs 28 has an upwardly extending shaft 40 fitting within the aperture 26 and abutting against a coil spring 42. Downward movement of the driven clutch member 36 is limited by a curved shoulder 44 bearing against the curved surface 34 of the flange 32. The lower portion of the driven clutch member 36 comprises a chuck 45 having a threaded axial aperture 46 within which is threaded a reduced shank 48 of a screw driver bit 50. The screw driver bit may have a driving element of any type necessary to cooperate with the screws desired to be handled by the apparatus and in the present illustration is provided with the usual flat blade 52. The blade is somewhat wider than the diameter of the bit 50 to provide flanged or shoulder portions 54 having a special utility to be described later. A pair of opposed splines 56 run longitudinally of the blade 52 and extend perpendicularly therefrom to impart strength and rigidity to the blade.

A collet 58 (Figs. 2 and 6) which in the present embodiment includes four yieldable or resilient fingers 60 has a hollow body portion or shank 62 which fits over the screw driver bit 50. The body portion 62 has a neck 64 of reduced diameter for a purpose to be described shortly. A sleeve 66 (Fig. 2) has an upper portion which fits between the depending tubular skirt 68 of the nose piece 30 and the collet 58. The skirt 68 has a slot 70 along an arc of its periphery which communicates with an annular groove 72. An annular groove 74 on the sleeve 66 cooperates with the groove 72 and a hardened wire spring 76 having a tail 78 is inserted into the cooperating grooves through the slot 70 to preclude relative axial movement of the nose piece 30 and the sleeve 66. The collet 58 is constantly urged downwardly within the sleeve 66 by a coil spring 80 abutting against the flange 32 of the nose piece and against the upper edge of the body portion 62 of the collet. Downward movement of the collet is limited by a plurality of steel ball bearings 82 riding within the neck portion 64 of the collet and in a groove or raceway 84 on the inner surface of the sleeve 66. The balls may be inserted into this position through a radial aperture 86 (Fig. 6) in the sleeve 66. This aperture may be closed by a small screw threaded therein if desired, although it is not necessary as the depending skirt 68 of the nose piece prevents the balls from exiting through this aperture. As will be noted, the elongated neck 64 allows the collet to be pushed upwardly against the action of the spring 80 for a purpose to be described later.

The tips 88 of the resilient fingers 60 of the collet are flared outwardly and are provided on their inner faces with a beveled surface 90 cut back to form an inclined shoulder 92 at the bottom of a portion 94 shaped to accommodate the head of a screw to be used with the screw driver. The small diameter of the shoulder is somewhat less than the diameter of screw heads to be handled so that the collet fingers will resiliently grip a screw head. The flanges 54 of the blade of the screw driver fit within opposed slots between the fingers 60 to cause the collet 58 to rotate with the screw driver bit 50 to prevent marring a screw.

The sleeve 66 is provided with a depending skirt 96 of enlarged diameter which is of substantially the same radial dimensions as the skirt 68 of the nose piece 30. Within the skirt 96 is carried a collet closing sleeve or collar 98 having an upper portion of reduced outer diameter providing a shoulder 100. A plurality of steel ball bearings 102 ride atop the shoulder 100 and have above them a ring or ball race 104. A light coil spring 106 abuts against the ball race 104 and against the upper portion of the sleeve 66 to urge the collet closing sleeve 98 downward. The lower portion of the collet closing sleeve 98 is provided with a beveled inner surface 108 which abuts against the tips 88 of the collet fingers to limit downward movement of the collet closing sleeve 98 and to lock the collet fingers in screw securing position.

In Figs. 2 and 5 the parts are shown in their normal quiescent condition in which the collet closing sleeve 98 extends a slight distance below the tips 88 of the collet fingers, both the collet and the collet closing sleeve being urged to their furthest downward position by the action of the springs 80 and 106. In operation, screws 110 are supplied one by one in vertical head-upward position by any desirable means which may include a fork-shaped anvil 112 (Fig. 7). The entire screw driving mechanism is moved downwardly with the driving bit 50 in axial alignment with the screw to be picked up. As the collet closing or locking sleeve 98 abuts against the anvil 112, it is moved upwardly against the action of the spring 106 to allow the collet fingers 60 to be cammed open by the head of the screw 110 acting against the beveled surfaces 90 of the tips 88 of the collet fingers. A delivery member 114 pushes the screw 110 upward away from the anvil 112 (Fig. 8) until the head of the screw fits against the surface 94 and is engaged by the shoulder 92. The resilient fingers 60 then snap inwardly to grip the screw lightly and lift it away from the anvil 112. This lifting movement, as may be seen in Fig. 9, allows the collet locking sleeve 98 to descend under the action of the spring 106 to lock the collet fingers against opening. It is important to note that substantially all of the gripping force on the screw head is supplied by the resiliency of the collet fingers and substantially none by clamping action of the collet locking sleeve 98, as its primary function is to lock the collet fingers against spreading. Consequently the spring 106 need not be a very stiff one. When the screw driving mechanism is brought down against a work piece 116 (Fig. 10) with the screw 110 in alignment with an aperture 118 therein, the abutment of the screw threads against the work piece causes the screw to resist downward movement and causes an upward thrust against the collet 58 which causes the spring 80 to compress as the driving bit 50 is moved downwardly toward the screw 110. The driving bit 50 is not rotating due to disengagement of the driving and driven clutch members 24 and 36 respectively under the action of the spring 42. As the screw 110 is gripped only very lightly by the collet, the screw will be stalled by the work piece 116 and will not rotate until the screw driving bit 50 engages the screw head to force the clutch into engagement to rotate the bit sufficiently for the blade 52 to enter the kerf of the screw 110, at which time the screw begins to be driven into the aperture 118. When the driving is nearly completed, the collet locking sleeve 98 abuts against the work piece 116 and is forced relatively upwardly against the action of the spring 106 to release the tips 88 of the fingers 60 so that the tips may be cammed outwardly away from the screw head, as shown in Fig. 10, as the screw is driven home.

Although I have shown and described my invention as applied to a particular type of power-operated hand-held screw driver, it is apparent that the invention can be applied with great advantage to other types of power-operated or hand-operated screw drivers. The features of the invention relative to the picking up of an article or fastener can be applied with advantage to the picking up and feeding of other types of headed articles or fasteners having heads distinguished by diameters larger than the shanks or by necks of reduced diameter. Many types of drivers or feeding means of other kinds can be used and such applications will be apparent to those skilled in the art. As the gripping force is supplied by the resiliency of the collet fingers and the collet locking sleeve or collar exerts little or no clamping force on the fingers the springs urging the collet and collet locking collar can be comparatively light. Consequently, little axial force is required to unlock the collet by abutment of the sleeve against a screw supporting surface when receiving or discharging a screw and little additional axial force is required to bring the screw driver blade into engagement with the screw. As a consequence of this, an operator may use a screw driver embodying my invention for an extended period without becoming unduly tired and the collet and sleeve will not mar a screw supporting surface. Additionally, there is no danger of the jamming which occurs when a conventional collet is clamped too tightly and the edges of a screw head are not marred by overly tight clamping. The lack of relative rotation between the driving blade and collet further precludes marring of screw heads.

It is obvious that various changes may be made in the specific embodiment set forth for purposes of illustration without departing from the spirit of the invention. The invention is accordingly not to be limited to the specific embodiment shown and described, but only as indicated in the following claims.

I claim:

1. A power driven screw driver for use with screws having heads with a predetermined maximum diameter, comprising rotary driving means, a driving clutch member operatively connected to said driving means, a driven clutch member, resilient means normally holding said driving and driven clutch members out of engagement, a screw driving bit, collet means including a plurality of yieldable fingers surrounding said bit, said collet means having an internal portion of greater diameter than said predetermined maximum diameter and shoulders extending inwardly from the tips of said fingers beneath said internal portion to underlie the head of said screw loosely to retain the same, resilient means normally urging said yieldable fingers forwardly of said bit, means providing for relative axial motion of said bit and said fingers, a collar surrounding said fingers for retaining said fingers against yielding, resilient means normally urging said collar forwardly of said fingers in retaining position, said collar being forced backwardly into non-retaining position by abutment against a screw support, said fingers being forced backwardly by abutment against a screw to engage the screw with said bit, and engagement of said bit with a screw forcing said driving and said driven clutch members into engagement.

2. A screw driver for use with screws having heads of a predetermined maximum diameter, comprising a screw driving bit, collet means including a plurality of yieldable fingers surrounding said bit, a housing surrounding said collet means and said bit, said housing having an internal ring-like groove forming a bearing race, said collet means having a peripheral relieved portion of substantial axial extent compared with the groove in said housing, a plurality of balls in said groove and said relieved portion for affording rotational and limited axial movement between said collet means and said housing, spring means urging said collet means forwardly of said bit and said housing, the forward position of said collet means being limited by said balls, means on the fingers of said collet means for loosely holding a screw, said holding means having an internal portion of greater diameter than said predetermined maximum diameter and shoulder means extending inwardly therefrom to underlie the head of said screw, means engageable with said fingers for retaining said portion of greater diameter against enlargement captively to retain one of said screws by the head and free for rotation relative to said collet fingers, spring means normally urging said retaining means forwardly of said housing into retaining position, and means limiting rearward movement of said retaining means relative to said housing as said retaining means is retracted for picking up and releasing screws, said balls limiting rearward movement of said collet means relative to said housing as said collet means is retracted for engagement of a screw held thereby with said bit.

3. In a screw driver for driving screws having heads of a predetermined maximum diameter, the combination of a screw bit, collet means including a plurality of yieldable fingers surrounding said bit, spring means normally urging said fingers forwardly of said bit, means on said fingers for engaging and holding a screw, said last named means having an internal portion of greater diameter than said predetermined maximum diameter and having shoulder means extending inwardly therefrom to underlie the head of said screw, means providing for relative axial motion of said bit and said collet means, means precluding relative rotational movement of said bit and said collet means, means for retaining said portion of greater diameter against enlargement captively to retain said screw by the head and free for rotation relative to said collet fingers, and spring means for urging the collet retaining means forwardly of said collet when in retaining position, said retaining means being moved into non-retaining position and said collet means retracted by abutment with a screw support and a screw respectively when receiving or discharging a screw.

4. In a screwdriver device, a screw driver bit, a collet means telescopically associated with said bit and slidably mounted relative thereto, said collet means normally extending in advance of said bit and comprised of a plurality of yieldable spaced apart fingers with holding means at their free ends cooperable with the head of an article to position said head for engagement by said bit, said holding means normally being spaced apart a predetermined distance, and collet retaining means telescopically and slidably mounted on said collet means and spring urged relative thereto so as to normally extend in advance of the free ends of said fingers and adapted in such extended position to embrace and thereby to retain said fingers in normal spaced apart position, said collet retaining means in the vicinity of its end which extends beyond the free ends of said fingers having an increased internal diameter so that in its retracted position said fingers may be flexed outwardly to accept and subsequently release the head of the article.

5. In a screw driver device of the type set forth in claim 4 wherein said bit is provided with extensions which project radially outwardly into the space between said yieldable fingers of said collet so that said collet is rotated with said bit as a unit.

6. In a screw driver device of the type set forth in claim 4 wherein the inner surface of the free ends of said fingers and the inner surface of the extended portion of said collet retaining means have conical surfaces which provide a flared opening to facilitate entry of the head of an article thereinto.

JOHN S. STULL.

REFERENCES CITED

The following references are of record in the file of this patent:

UNITED STATES PATENTS

| Number | Name | Date |
|---|---|---|
| 332,438 | Richardson | Dec. 15, 1885 |
| 2,235,374 | Kellogg | Mar. 18, 1941 |
| 2,272,279 | Schindel | Feb. 10, 1942 |
| 2,327,074 | Snyder | Aug. 17, 1943 |
| 2,370,407 | McCartney | Feb. 27, 1945 |
| 2,399,138 | Nygard | Apr. 23, 1946 |